United States Patent [19]
Härtel et al.

[11] Patent Number: 5,302,336
[45] Date of Patent: Apr. 12, 1994

[54] METHOD FOR PRODUCING MOLDED HOSE BRANCHES FROM RUBBER AND A HOSE PRODUCED BY THE METHOD

[75] Inventors: Volker Härtel, Germering; Carl Heynemann, Taufkirchen; Hermann Kahlefeld, Hemsbach, all of Fed. Rep. of Germany

[73] Assignee: Metzeler Automotive Profiles GmbH, Lindau, Fed. Rep. of Germany

[21] Appl. No.: 810,690

[22] Filed: Dec. 19, 1991

Related U.S. Application Data

[63] Continuation-in-part of Ser. No. 449,364, Dec. 4, 1989, abandoned, which is a continuation-in-part of Ser. No. 206,267, Jun. 13, 1988, abandoned.

[30] Foreign Application Priority Data

Apr. 16, 1987 [DE] Fed. Rep. of Germany ....... 3713064

[51] Int. Cl.5 ............................................. B29C 45/00
[52] U.S. Cl. ................................. 264/263; 264/328.1
[58] Field of Search ................... 264/263, 265, 271.1, 264/279, 328.1; 285/156, 423, 919

[56] References Cited

U.S. PATENT DOCUMENTS

| | | | |
|---|---|---|---|
| 3,458,619 | 7/1969 | Prochaska | 264/263 |
| 4,650,220 | 3/1987 | Grabowski | 264/263 |

*Primary Examiner*—Jan H. Silbaugh
*Assistant Examiner*—Christopher A. Fiorilla
*Attorney, Agent, or Firm*—Herbert L. Lerner; Laurence A. Greenberg

[57] ABSTRACT

A method for producing molded hose branches of rubber and a molded hose branch produced according to the method, includes slipping completely vulcanized rubber hose lengths with ends onto free ends of a plastic tubing branching piece for forming an assembly, placing the assembly into a mold, and injection molding a thermoplastic rubber material in the form of a blended mixture of polypropylene and EPDM around the assembly for joining the thermoplastic material to the rubber hose lengths for forming a sleeve around the rubber hose lengths and free parts of the tubing branching piece between the ends of the rubber hose lengths.

4 Claims, 1 Drawing Sheet

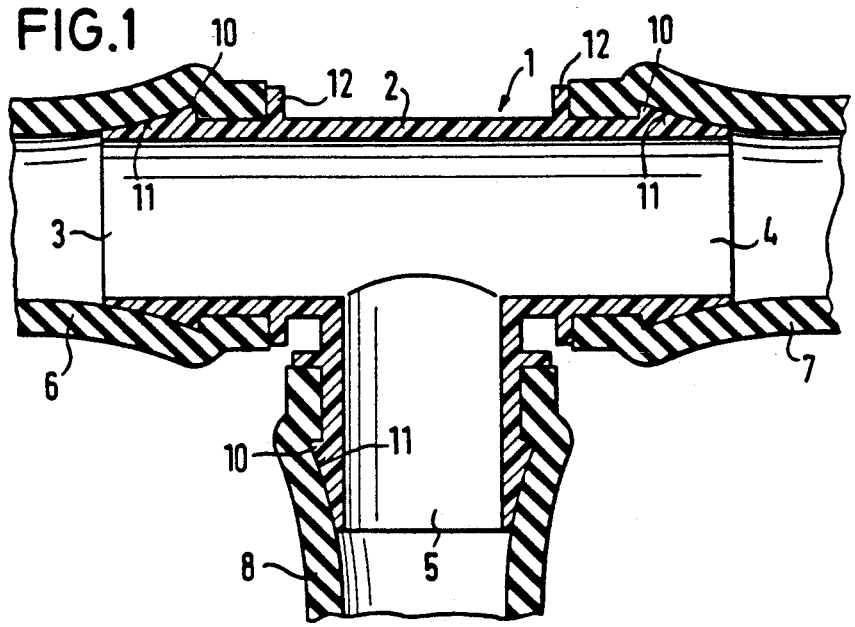
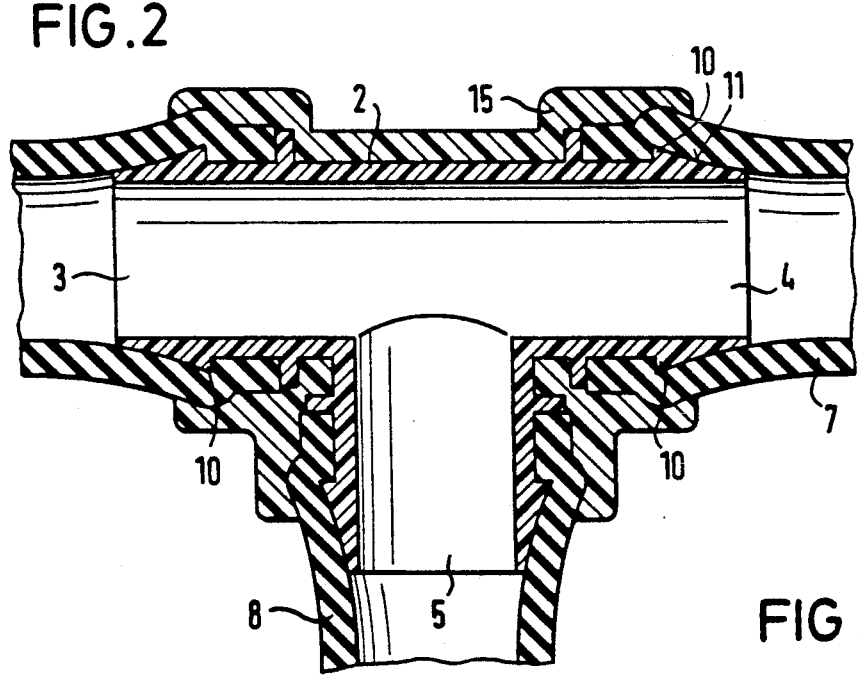
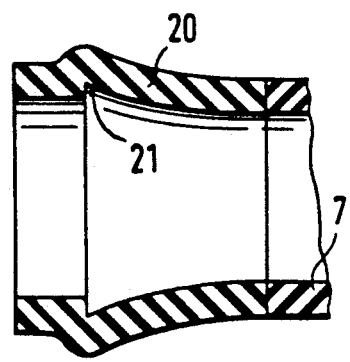

METHOD FOR PRODUCING MOLDED HOSE BRANCHES FROM RUBBER AND A HOSE PRODUCED BY THE METHOD

CROSS-REFERENCE TO RELATED APPLICATIONS

This application is a continuation in part of application Ser. No. 07/449,364 filed Dec. 4, 1989 which is a continuation-in-part of application Ser. No. 07/206,267, filed Jun. 13, 1988 both now abandoned.

BACKGROUND OF THE INVENTION

1. Field of the Invention

The invention relates to a method for producing molded hose branches from rubber, especially motor vehicle radiator or coolant hoses, in which fully vulcanized lengths of hose are slipped onto the free ends of a plastic tubing branching piece and are secured in a fluid-tight manner, as well as a molded hose branch produced according to the method.

2. Description of the Related Art

A method of this kind is known from German Published, Non-Prosecuted Application DE-OS 32 39 623. According to that method, suitable lengths of hose are slipped onto a plastic or metal tubing branching piece which has flared free edge surfaces, with the introduction of a vulcanizable adhesive compound, and are completely vulcanized. As a result, even although a firm coupling is produced and in particular free manipulability of the location of the branch is attained, because of the repetitive stresses arising with radiator hoses especially due to fluctuating pressure in the interior of the hoses, there is the danger that the hoses, will come loose from the tubing branching piece, since there is no external clamping force that prevents the hoses from stretching open.

It is accordingly an object of the invention to provide a method for producing molded hose branches from rubber and a hose produced by the method, which overcome the hereinafore-mentioned disadvantages of the heretofore-known methods and products of this general type and which reliably intercept such repetitive forces so as to reliably avoid stretching open of the hoses in the vicinity of the coupling location and a gradual loosening from the tubing branching piece.

SUMMARY OF THE INVENTION

With the foregoing and other objects in view there is provided, in accordance with the invention, a method for producing molded hose branches of rubber, which comprises slipping completely vulcanized rubber hose lengths with ends onto free ends of a plastic tubing branching piece for forming an assembly, placing the assembly into a mold, and injection molding a thermoplastic rubber material being a blended mixture of polypropylene and EPDM (ethylene-propylene-diene-monomer) around the assembly for joining the thermoplastic material to the rubber hose lengths for forming a sleeve around the rubber hose lengths and free parts of the tubing branching piece between the ends of the rubber hose lengths.

The mixture of polypropylene and EPDM affords an integral and very firm bond between the sleeve and the rubber hose lengths. The sleeve and the rubber hose lengths are virtually fused by the injection molded thermoplastic composition.

In accordance with another mode of the invention, there is provided a method which comprises joining the thermoplastic composition to the polymer of the rubber of the rubber hose lengths in a molten state, forming a sleeve bonded to the rubber hose lengths.

In accordance with a further mode of the invention, there is provided a method which comprises placing the tubing branching piece with the rubber hose lengths slipped thereon in an injection mold defining a space therebetween, and filling the space with the thermoplastic composition during the injection molding step.

Cross-spraying with such a material that bonds to the rubber hoses and has a high modulus of elasticity, on the one hand assures a firm and fluid-tight coupling and retention of the hoses on the tubing branching piece and on the other hand reliably prevents the hoses from stretching outward and thus being able to come loose from the tubing branching piece over the course of time under load and operating conditions.

In accordance with an added mode of the invention, there is provided a method which comprises selecting a polyolefin as the thermoplastic composition.

In accordance with an additional mode of the invention, there is provided a method which comprises selecting polyethylene as the polyolefin composition.

In accordance with yet another mode of the invention, there is provided a method which comprises selecting polypropylene as the polyolefin composition.

With the objects of the invention in view, there is also provided a method for producing molded hose branches of rubber, especially for motor vehicle radiator or coolant hoses, which comprises slipping completely vulcanized rubber hose lengths with ends onto free ends of a plastic tubing branching piece defining portions of the tubing branching piece covered by the rubber hose lengths and remaining portions, securing the rubber hose lengths to the free ends, injection molding the ends of the rubber hose lengths slipped onto the tubing branching piece and the remaining portions of the tubing branching piece with a cross-linkable composition having an affinity to a base polymer of the rubber of the rubber hose lengths and having a modulus of elasticity higher than that of the rubber of the rubber hose lengths by at least one order of magnitude, and cross-linking the ends of the rubber hose lengths slipped onto the tubing branching piece and the remaining portions of the tubing branching piece with the cross-linkable composition under temperature.

In accordance with yet a further mode of the invention, there is provided a method which comprises forming a sleeve bonded to the rubber hose lengths from the cross-linkable composition during the injection molding and cross-linking steps.

In accordance with yet an added mode of the invention, there is provided a method which comprises placing the tubing branching piece with the rubber hose lengths slipped thereon in an injection mold defining a space therebetween, and filling the space with the cross-linkable composition during the injection molding step.

In accordance with yet an additional mode of the invention, there is provided a method which comprises selecting polyethylene with peroxide as the cross-linkable composition.

With the objects of the invention in view, there is furthermore provided a method for producing molded hose branches of rubber, especially for motor vehicle radiator or coolant hoses, which comprises slipping completely vulcanized rubber hose lengths with ends onto free ends of a tubing branching piece formed of a cross-linkable composition having an affinity to a base polymer of the rubber of the rubber hose lengths and having a modulus of elasticity higher than that of the rubber of the rubber hose lengths by at least one order of magnitude, defining portions of the tubing branching piece covered by the rubber hose lengths and remaining portions, securing the rubber hose lengths to the free ends, injection molding the ends of the rubber hose lengths slipped onto the tubing branching piece and the remaining portions of the tubing branching piece with a layer of the cross-linkable composition, and cross-linking the ends of the rubber hose lengths slipped onto the tubing branching piece and the remaining portions of the tubing branching piece with the layer of the cross-linkable composition under temperature forming a sleeve bonded to the rubber hose lengths.

It is particularly suitable for the same material to be used for the tubing branching piece as for the sleeve, because in that case the temperature action also brings about bonding of the rubber hoses to the tubing branching piece.

In accordance With still another mode of the invention, there is provided a method which comprises selecting EPDM rubber as the material for the rubber hose lengths.

In accordance with still a further mode of the invention, there is provided a method which comprises locking the tubing branching piece to the slipped-on rubber hose lengths with an encompassing, substantially sawtooth-shaped rib on the free tube ends of the tubing branching piece.

In accordance with still an added mode of the invention, there is provided a method which comprises vulcanizing hose end pieces having the same shape as the free ends of the tubing branching piece onto the rubber hose lengths prior to slipping the rubber hose lengths onto the free ends of the tubing branching piece. This is done in order to improve the form-locking effect. A form-locking connection is one which connects two elements together due to the shape of the elements themselves, as opposed to a force-locking connection, which locks the elements together by force external to the elements.

With the objects of the invention in view, there is additionally provided a molded hose branch, especially for motor vehicle radiator or coolant hoses, comprising a rigid plastic tubing branching piece having free ends, rubber hose lengths slipped and secured onto the free ends of the tubing branching piece defining portions of the tubing branching piece between the rubber hose lengths, and a sprayed-on composition surrounding and joining the rubber hose lengths and the portions of the tubing branching piece, the composition being bonded at least to the rubber hose lengths and having a modulus of elasticity higher than that of the rubber of the rubber hose lengths by at least one order of magnitude.

In accordance with another feature of the invention, the composition forms a sleeve with a modulus of elasticity of substantially between 500 and 3000 N/mm$^2$.

In accordance with a further feature of the invention, the free tube ends of the tubing branching piece have outer surfaces with encompassing ribs formed thereon form-locking the slipped-on rubber hose lengths to the tubing branching piece, the ribs having substantially sawtooth-shaped cross sections and sides dropping off gently toward the free tube ends.

In accordance with an added feature of the invention, the tubing branching piece has an outer surface with radially protruding pin-shaped stops formed thereon in the vicinity of the free ends of the tubing branching piece for stopping the rubber hose lengths.

In accordance with a concomitant feature of the invention, the rubber hose lengths have end pieces vulcanized thereon, the end pieces having inner contours corresponding to the sawtooth-shaped ribs.

Other features which are considered as characteristic for the invention are set forth in the appended claims.

Although the invention is illustrated and described herein as embodied in a method for producing molded hose branches from rubber and a hose produced by the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, cross-sectional view of a tubing branching piece, such as in the form of a T, having lengths of hose slipped onto it, in a prefabricated state;

FIG. 2 is a view similar to FIG. 1 of a finished hose branch with a sprayed-on sleeve; and FIG. 3 is a fragmentary, cross-sectional view of an end of a hose having a separately vulcanized-on end piece.

DESCRIPTION OF THE PREFERRED EMBODIMENT

Referring now to the figures of the drawings in detail and first, particularly, to FIGS. 1 and 2 thereof, there is seen a simplified embodiment of a hose for a branch having a single T-shaped hose branch, since the principle of the invention can be explained most simply with this embodiment. As can be seen from FIG. 1, a T-shaped branch 1 is primarily formed of a T-shaped tubing branching piece 2 having free tubing stubs or ends 3, 4 and 5. The stub 5 forms the actual branch which is attached at an angle of 90°. However, the actual branch may also be attached to the main tube at any other arbitrary angle depending on the required application for the branch. Moreover, it is equally possible to place a plurality of branches and not merely one branch at various three-dimensional or solid angles relative one another. The tubing branching piece 2 is to be firmly joined to individual lengths of hose 6, 7 and 8 that form the finished branch or branching piece 1.

In order to provide a mechanical, form-locking coupling, the outsides of the free tube ends or tubing stubs 3, 4 and 5 of the tubing branching piece 2 each have an encompassing rib 10 with an approximately sawtooth-like cross section and a side 11 gradually dropping off toward the tube end. A form-locking connection is one which connects two elements together due to the shape of the elements themselves, as opposed to a force-locking connection, which locks the elements together by force external to the elements. The pieces of hose 6, 7 and 8 can therefore be easily slipped over these ribs 10, while a retraction is counteracted by considerable resistance because of the sawtooth-like structure of the ribs.

In order to accurately position the lengths of hose 6, 7 and 8 on the T-shaped piece in the radial direction as well, the outside of the tubing branching piece 2 may also be provided with radially protruding pin-like stops 12, which limit the extent to which the corresponding lengths of hose 6, 7 and 8 may be slipped on.

The hose branch which has been prefabricated in this way is then placed in a non-illustrated mold and, in accordance with FIG. 2, it is injection molded with a material forming a sleeve 15 that covers the hose ends 6, 7 and 8 and the free regions or remaining portions of the tubing branching piece 2 between the hose lengths in the space between the mold and these parts. The material then sets or cross-links.

The material used for the sleeve 15 should be a thermoplastic or cross-linkable composition that has a modulus of elasticity which is very much higher than that of the rubber, in other words at least one order of magnitude greater. A polyolefin such as polyethylene or polypropylene is particularly suitable as the thermoplastic composition. A polyethylene with peroxide can be used as the cross-linkable composition. In the preferred embodiment and the best mode, the material forming the sleeve 15 is a thermoplastic material which is a blended mixture of polypropylene and EPDM.

An essential factor in this case is that the curable or cross-linkable composition has an affinity for, or is chemically identical to, a base polymer of the rubber. EPDM is preferably used as the rubber for the hose lengths. In fact, besides the cross-linked portion, an EPDM of this kind has sufficiently long chain-like segments that can be melted on, so that at a suitable temperature of the sleeve material, a bonding of the sleeve 15 to the hose lengths 6, 7 and 8 takes place and thus a fluid-tight, firm coupling between the sleeve 15 and the lengths of hose 6, 7 and 8 which cannot be undone by mechanical strains, is assured.

If the tubing branching piece 2 is additionally made from the same material as the sleeve 15, then not only does bonding take place between the branching piece 2 and the sleeve 15 but also between the tube ends 3, 4 and 5 and the slipped-on hose lengths 6, 7 and 8. Thus these lengths of hose 6, 7 and 8 are not only bonded to the sleeve 15 toward the outside but are also bonded to the branching piece 2 toward the inside and are thus firmly joined with them, so that stretching of the hose lengths 6, 7 and 8 and resultant detachment from the branching piece 2, is practically no longer possible.

This stretching of the hose lengths 6, 7 and 8 is also prevented by providing that the sleeve 15 has a modulus of elasticity that is higher by at least one order of magnitude than that of the rubber. Suitably, the modulus of elasticity of the sleeve 15 should be on the order of magnitude of approximately 500 to 3000 N/mm$^2$ at room temperature.

Since the longitudinal extension of the sleeve 15 also extends over the vicinity of the form-locking couplings provided by means of the ribs 10 and thus forms a rigid binding in this region, additional security against detachment of the hose lengths 6, 7 and 8 is provided.

In order to assure that the hose ends rest tightly in the vicinity between the ribs 10 and the stops 12, it is advantageous for the hose lengths 6, 7 and 8 to have separately vulcanized-on end pieces 20 as shown in FIG. 3. The inner contour of the end pieces 20 corresponds to the outer contour of the branching piece 2 in the vicinity of the ribs 10 Due to the likewise sawtooth-like groove 21 thus formed in the vulcanized-on end pieces 20, a direct form lock with the corresponding outer contour of the tubing branching piece 2 is produced when the hose lengths are slipped on.

With the method described above, it is thus possible in a simple manner to provide a hose branch which has any arbitrary configuration as well as a variable number of hose branches, which are simple to manufacture and are extremely durable even when subjected to repetitive stresses at elevated temperature.

We claim:

1. Method for producing flexible molded hose branches of rubber, which comprises slipping three completely vulcanized rubber hose lengths with ends onto free ends of a T-shaped plastic tubing branching piece for forming an assembly, placing the assembly into a mold, and injection molding a thermoplastic rubber material being a blended mixture of polypropylene and EPDM around the assembly for joining the thermoplastic material to the rubber hose lengths for forming a sleeve around the rubber hose lengths and free parts of the tubing branching piece between the ends of the rubber hose lengths.

2. Method according to claim 1, which comprises selecting EPDM rubber as the material for the rubber hose lengths.

3. Method according to claim 1, which comprises locking the tubing branching piece to the slipped-on rubber hose lengths with an encompassing, substantially sawtooth-shaped rib on the free tube ends of the tubing branching piece.

4. Method according to claim 3, which comprises vulcanizing hose end pieces having the same shape as the free ends of the tubing branching piece onto the rubber hose lengths prior to slipping the rubber hose lengths onto the free ends of the tubing branching piece.

* * * * *